United States Patent
Rutz et al.

[15] 3,674,874
[45] July 4, 1972

[54] INSECTICIDAL AND ACARICIDAL COMPOSITIONS

[72] Inventors: Hans Rutz, Basel; Kurt Gubler, Riehen, both of Switzerland

[73] Assignee: Ciba-Geigy Corporation, Ardsley, N.Y.

[22] Filed: June 8, 1970

[21] Appl. No.: 44,558

Related U.S. Application Data

[63] Continuation-in-part of Ser. No. 723,905, April 24, 1968, abandoned.

[30] Foreign Application Priority Data

April 26, 1967 Switzerland .......................5960/67

[52] U.S. Cl. ...........................................424/273, 260/309
[51] Int. Cl. .................................................A01n 9/22
[58] Field of Search ........................424/273; 260/309

[56] References Cited

UNITED STATES PATENTS

| | | | |
|---|---|---|---|
| 3,409,606 | 11/1968 | Lutz et al. | 260/309 X |
| 3,423,420 | 1/1969 | Büchel et al. | 260/309 |
| 3,435,050 | 3/1969 | Wasco | 260/309 |

FOREIGN PATENTS OR APPLICATIONS

| | | | |
|---|---|---|---|
| 1,088,895 | 10/1967 | Great Britain | 260/309 |
| 1,154,722 | 6/1969 | Great Britain | 260/309 |
| 1,494,338 | 7/1967 | France | 260/309 |

*Primary Examiner*—Stanley J. Friedman
*Assistant Examiner*—Norman A. Drezin
*Attorney*—Karl F. Jorda and Frederick H. Rabin

[57] ABSTRACT

A method of controlling insects and a method for controlling acarinae, especially of the kind infesting warm-blooded animals as well as compositions are described which involve the use of an insecticidally or acaricidally effective amount of a 2,4,5-trihalogenoimidazole substituted in 1-position by a group of the formula R — X — A — wherein R represents an optionally substituted aliphatic hydrocarbon radical; X represents one of the bridges —O—, —S—,

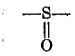

and

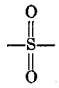

, and A represents an alkylene radical, the compositions also contain carriers, distributing agents and the like which are compatible with the aforesaid active compounds and well tolerated by warm-blooded animals.

13 Claims, No Drawings

INSECTICIDAL AND ACARICIDAL COMPOSITIONS

This application is a continuation-in-part of our pending patent application Ser. No. 723,905, filed on Apr. 24, 1968 now abandoned.

DETAILED DISCLOSURE

This invention relates to methods of controlling insects and acarinae, especially such acarinae which infest warm-blooded animals, as well as new insecticidal and acaricidal compositions which contain new imidazole derivatives as active substances, in addition, processes for the production of these compositions.

N-substituted trihalogen imidazoles with herbicidal, insecticidal and acaricidal activity are known from the literature.

The present invention provides methods of controlling insects and acarinae, and also new insecticidal and acaricidal compositions, the latter especially for application to animals infested with acarinae, which methods use and which compositions contain as active substances new imidazole derivatives of the general formula

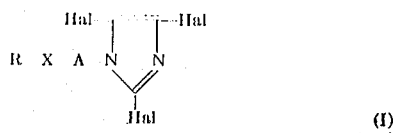

wherein

R represents an unsubstituted or substituted aliphatic hydrocarbon radical,

X represents an oxygen, sulphur, sulphinyl or sulphonyl bridge,

A represents an alkylene radical, and

Hal represents a halogen atom having an atomic number of at most 35.

In the imidazole derivatives of general formula I, R, as aliphatic hydrocarbon radical can represent, e.g. an alkyl radical having one to 16 carbon atoms preferably however, a low alkyl radical such as the methyl, ethyl, propyl, butyl or pentyl radicals etc., also it can represent a low alkenyl radical such as the allyl, crotyl or methallyl radical, or a low alkinyl radical such as the propinyl or 1-methyl-2-propinyl radical. These hydrocarbon radicals can be mono- or poly- substituted, e.g. by halogen, alkoxy, alkylthio or cyano groups. The chain of the alkylene radical A can be straight or branched and has, preferably, one or two carbon atoms as chain members. Preferred halogen atoms Hal are chlorine and, particularly, bromine.

Certain compositions according to the invention are excellently suited for the protection of stored goods and harvested crops and other organic substrates with the exception of growing plants against attack by insects; while others are suited for the control of acarinae, especially of the kind infesting warm-blooded animals, in particular domestic and farm animals.

The new imidazole derivatives of the general formula I are obtained by reacting according to procedure a. a trihalogen imidazole of the general formula II

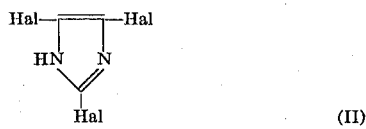

with an ether of the general formula III $$R - X' - A - Hal \quad (III)$$

in which formulas Hal, R and A have the meanings given in Formula I, and

X' represents oxygen or sulphur, in the presence of an acid binding agent, or by reacting according to procedure b. a trihalogen imidazole of the general formula IV

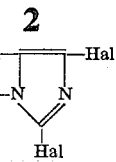

with a compound of the general formula V $$R - Z \quad (V)$$

in which formulas

Y and Z, with the exception of an O or S atom contained in either Y or Z, represent radicals which are split off in the reaction, and Hal, R and A have the meanings given in Formula I, optionally in the presence of an acid binding agent; and, if desired, oxidizing the end products of the general formula I, wherein X represents sulphur, to the corresponding sulphinyl or sulphonyl derivatives.

The new imidazole derivatives of general formula I contained in the compositions according to the invention have very good insecticidal and acaricidal properties, some are predominantly acaricides.

Active substances of Formula I in which X is oxygen are particularly suitable as insecticides for the protection of stored goods and harvested crops and other organic substrates with the exception of growing plants because of their secondary herbicidal action which is sometimes present. They are also suitable as agents for controlling acarinae which infest warm-blooded animals, especially ticks.

The active substances contained in the compositions according to the invention are well tolerated by warm-blooded animals in the dosages required for effective control of insects or acarinae.

The new insecticidal compositions which contain imidazoles of general formula I wherein X is oxygen have an excellent contact and stomach action on chewing and sucking insects. These compositions can serve, e.g. for combatting the following insects: insects of the families Muscidae, Stomoxidae and Culicidae, e.g. the polyvalent resistant and normally sensitive house flies (*Musca domestica*), stable flies (*Stomoxys calcitrans*) and mosquitoes (e.g. *Aedes aegypti, Culex fatigans, Anopheles stephensi*); insects of the families Curculionidae, Lariidae, Dermestidae and Tenebrionidae, e.g. granary weevils (*Sitophilus granarius*) bean beetles (*Bruchidius obtectus*), larder beetles (*Dermestes vulpinus*), yellow meal worms (*Tenebrio molitor*) and their larval stages and insects of the families Pyralididae, e.g. Mediterranean flour moths (*Espestia kühniella*). Those compounds of the Formula I wherein R is an alkyl radical having five carbon atoms, X is oxygen, A is the methylene radical and Hal is chlorine are particularly suitable for combatting insects of the family Blattidae, e.g. cockroaches (*Phyllodromia germanica, Periplaneta americana* and *Blatta orientalis*).

The new acaricidal compositions containing active substances of Formula I wherein X is oxygen and also those wherein X is sulphur, sulphinyl or sulphonyl, and wherein at least one, and preferably all three Hal represent chlorine, are suitable for combatting acarinae infesting warm-blooded animals, and particularly ticks, and even against strains which have developed resistance to such well-known acaricides as Diazinone. Active substances of Formula I in which X is a sulphur, sulphinyl or sulphonyl bridge and at least one, but preferably all three of the halogen substituents at the imidazole nucleus are chlorine atoms, are useful as insecticides and also active against acarinae infesting warm-blooded animals, and particularly against ticks, and even against Diazinone-resistant strains.

The acaricidal compositions used for controlling acarinae infesting warm-blooded animals should contain carriers which are well tolerated by warm-blooded animals.

Compounds of Formula I in which X represents sulphur are generally preferred because they are particularly well tolerated by warm-blooded animals even when applied in relatively high concentrations (0.2 g per liter and higher).

In mixtures with synergists or auxiliaries having a similar action such as succinic acid dibutyl ester, piperonyl butoxide, olive oil, peanut oil, as well as by the addition of esters and amides of phosphoric acid, phosphonic acid, thio- and dithiophosphoric acid, carbamic acid esters, DDT and analogues thereof, pyrethrines and synergists thereof, the above-described insecticidal and acaricidal action of the new imidazoles falling under Formula I contained in the composition according to the invention can be considerably improved, widened and adapted to given external conditions. In addition, the new composition can be mixed and applied with substances which have bactericidal, fungicidal or nematocidal properties, by which a broadening of the biological activity is attained.

The new compositions comprise solid or liquid forms of application such as dusts, sprinkling agents, granulates, aqueous dispersions which are obtained from wettable powders, pastes and emulsion concentrates. They can be also applied as solutions or aerosols.

The compositions according to the invention are produced in the known way by intimately mixing and milling the active substance with suitable veterinarily acceptable carriers, optionally comprising dispersing agents or solvents which are compatible with the active substances and are, preferably, such that are well-tolerated by warm-blooded animals. The concentration of active substance in these compositions is e.g. 0.01 – 80 percent, preferably 10–80 percent, calculated on the total weight of the composition.

Compounds of the Formula I wherein R is alkyl having five carbon atoms, A is methylene, X is oxygen and Hal is chlorine are applied in concentrations of 10 mg to 10 g per square meter to areas which are to be treated to protect them against insects particularly those of the family Blattidae, e.g. cockroaches.

The imidazole derivatives of the general formula I are obtained by reacting either a. a trihalogen imidazole of the general formula II

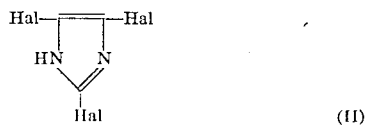

with a compound of the general formula III $$R - X - A - Hal \quad (III)$$

in which formulas Hal, X, R and A have the meanings given in Formula I, in the presence of an acid binding agent; or b. a trihalogen imidazole of the general formula IV

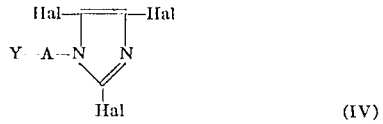

with a compound of the general formula V $$R - Z \quad (V)$$

in which formulas

Y and Z, with the exception of an S or O atom contained in either Y or Z, represent radicals which are split off in the reaction, and Hal, R and A have the meanings given in Formula I, optionally in the presence of an acid binding agent; and, if desired, oxidizing the end products of the general formula I, wherein X represents sulphur, to the corresponding sulphinyl or sulphonyl derivatives.

As acid binding agents in the process according to Procedures (a) and (b), preferably inorganic bases such as hydroxides and oxides of alkali and alkaline earth metals, e.g. potassium or sodium hydroxide, as well as alcoholates of low alkanols with alkali metals such as sodium and potassium methylate, ethylate, propylate, isopropylate, butylate, particularly potassium tert. butylate, or mixtures of hydroxides and alcoholates are used. It is of advantage to perform the process according to Procedures (a) and (b) in the presence of solvents or diluents which are inert to the reaction partners, i.e. hydrocarbons, halogenated hydrocarbons, amides such as dialkyl carboxylic acid amides, ethers and ether-type compounds, and also alcohols in the case of Procedure (b).

In the process according to Procedure (a) advantageously the trihalogen imidazole of the general formula II is converted with one of the strong inorganic bases mentioned above into the corresponding imidazole salt. Because of its sensitivity to air, this is preferably reacted in an inert gas atmosphere, e.g. under nitrogen, with an ether of general formula III.

Of the symbols Y and Z in general formulas IV and V, one represents the mercapto or hydroxyl group and the other a halogen atom, or one represents the group S—Me or O—Me wherein Me is a metal atom and the other represents a halogen atom.

The oxidation of imidazole derivatives of the general formula I, wherein X represents sulphur, to the corresponding sulphinyl or sulphonyl derivatives can be carried out with oxidizing agents such as hydrogen peroxide, organic peracids or potassium permanganate.

Some of the starting materials embraced by the general formulas II and IV are known and some are new. 2,4,5-trichloroimidazole falling under the general formula II can be prepared by reacting 2,4,5-tribromoimidazole with HCl. The compound falling under the general formula IV in which e.g. Hal in 2-position is chlorine, and in 4- and 5-position is bromine, and in which Y—A— represents chloromethyl, can be prepared by reacting the hydroxymethyl-tribromo derivative with thionyl chloride in dimethyl formamide.

The following examples describe the production of the new active substances. Where not otherwise expressly stated, parts are given as parts by weight and the temperatures are given in degrees Centigrade. Wherever mentioned, parts by weight are related to parts by volume as grams to milliliters.

EXAMPLE A a. 1058 parts of hydrogen chloride are introduced into a stirred solution of 890 parts of 2,4,5-tribromo-imidazole in 2800 parts by volume of dimethyl formamide, the temperature being allowed to rise to 110° during the introduction. The reaction mixture is kept at 130° for 6 hours. On cooling to room temperature the solution solidifies, and the resulting slurry of crystals is charged into 15,000 parts of water. The solid product is filtered, washed with water and dried. Recrystallization from 50 percent aqueous alcohol yields 2,4,5-tricholro-imidazole melting at 177°–180° with decomposition.

b. A solution of 4 parts of sodium hydroxide in 100 parts by volume of methanol is added to a solution of 17.1 parts of 2,4,5-trichloro-imidazole in 100 parts by volume of methanol and the resulting solution is evaporated at 40° under water pump vacuum. The solid residue is slurried twice with 100 parts by volume of anhydrous benzene and the solvent evaporated in vacuo in order to remove any water adhering thereto. The dry sodium salt of trichloro-imidazole is suspended in 300 parts by volume of anhydrous benzene. A solution of 8 parts of methoxymethyl chloride in 100 parts by volume of benzene is added dropwise to the suspension at room temperature while stirring and introducing nitrogen, whereupon a slightly exothermic reaction takes place and the sodium salt of the trichloro-imidazole dissolves and sodium chloride precipitates. The mixture is then stirred, first for 1 hour at room temperature, then for 1.5 hours at 60°. After cooling, the reaction mixture is extracted with water and then with 2N sodium carbonate solution to remove side products. After drying over sodium sulphate, the benzene phase is concentrated in vacuo. The oily residue is subjected to high vacuum distillation; the pure 1-methoxymethyl-2,4,5-trichloro-imidazole thus obtained boils at 80°–81°/0.007 mm Hg.

EXAMPLE B a. 180 Parts of thionyl chloride are added dropwise to a stirred solution of 426 parts of 1-hydroxymethyl-2,4,5-tribromoimidazole in 1,200 parts by volume of dimethyl formamide at a temperature of 0°. The reaction mixture is stirred for 3 hours at room temperature and then for 1 hour at 100°, and, after recooling to room temperature, poured into 5,000 parts of water. The precipitated solid product is filtered, washed with water and dried. After recrystallization from benzene, 1-chloromethyl-4,5-dibromo-2-chloro-imidazole is obtained, m.p. 86°–87°.

b. A solution of 15.5 parts of 1-chloromethyl-4,5-dibromo-2-chloro-imidazole and 6.8 parts of sodium ethylate in 100 parts by volume of anhydrous alcohol is heated to reflux temperature for 12 hours. The solvent is then removed and the residue dissolved in chloroform/water. The chloroform phase is washed with water, dried over sodium sulphate and evaporated. 1-ethoxymethyl-4,5-dibromo-2-chloro-imidazole is obtained in pure form from the oily residue by distillation; b.p. 107°–108°/0.005 mm Hg.

EXAMPLE C a. 1,058 parts of hydrogen chloride are introduced into a stirred solution of 890 parts of 2,4,5-tribromo-imidazole in 2,800 parts by volume of dimethyl formamide, the temperature being allowed to rise to 110° during the introduction. The reaction mixture is kept at 130° for 6 hours. On cooling to room temperature the solution solidifies, and the resulting slurry of crystals is charged into 15,000 parts of water. The solid product is filtered, washed with water and dried. Recrystallization from 50 percent aqueous alcohol yields 2,4,5-trichloro-imidazole melting at 177° – 180° with decomposition.

b. A solution of 4 parts of sodium hydroxide in 100 parts by volume of methanol is added to a solution of 17.1 parts of 2,4,5-trichloro-imidazole in 100 parts by volume of methanol and the resulting solution is evaporated at 40° under water pump vacuum. The solid residue is slurried twice with 100 parts by volume of anhydrous benzene and the solvent evaporated in vacuo in order to remove any water adhering thereto. The dry sodium salt of trichloro-imidazole is suspended in 300 parts by volume of anhydrous benzene. A solution of 10 parts of methylthiomethyl chloride in 100 parts by volume of benzene is added dropwise to the suspension at room temperature while stirring and introducing nitrogen, whereupon a slightly exothermic reaction takes place and the sodium salt of the trichloro-imidazole dissolves and sodium chloride precipitates. The mixture is then stirred, first for 1 hour at room temperature, then for 1.5 hours at 60°. After cooling, the reaction mixture is extracted with water and then with 2N sodium carbonate solution to remove side products. After drying over sodium sulphate, the benzene phase is concentrated in vacuo. The residue is recrystallized from alcohol and the pure 1-methylthiomethyl-2,4,5-trichloro-imidazole thus obtained has a melting point of 72° – 73°.

EXAMPLE D a. 180 parts of thionyl chloride are added dropwise to a stirred solution of 426 parts of 1-hydroxymethyl-2,4,5-tribromo-imidazole in 1,200 parts by volume of dimethyl formamide at a temperature of 0°. The reaction mixture is stirred for 3 hours at room temperature and then for 1 hour at 100°, and, after recooling to room temperature, poured into 5,000 parts of water. The precipitated solid product is filtered, Recrystallization with water and dried. After recrystallization from benzene 1-chloromethyl-4,5-dibromo-2-chloroimidazole is obtained, m.p. 86° – 87°.

b. A solution of 5.6 parts of sodium thio-sec.butylate in 100 parts by volume of alcohol is added dropwise to a solution of 15.5 parts of 1-chloromethyl-4,5-dibromo-2-chloro-imidazole in 100 parts by volume of anhydrous alcohol. The reaction mixture is allowed to stand overnight at room temperature. The solvent is then removed and the residue dissolved in ether/water. The ether phase is washed with water, dried over sodium sulphate and evaporated. 1-sec.butylthio-methyl-4,5-dibromo-2-chloroimidazole is obtained in pure form from the oily residue by distillation; b.p. 113°/0.001 mm Hg.

EXAMPLE E

A solution of 18.2 parts of 1-methylthiomethyl-2,4,5-tribromoimidazole and 5.7 parts by volume of 30 percent aqueous hydrogen peroxide in 50 parts by volume of glacial acetic acid is allowed to stand at room temperature for 3 days. Upon dilution of the reaction mixture with water, the product separates as an oil. The mixture is neutralized with 2N NaOH and the product is extracted with chloroform. The chloroform phase is washed with water, dried, and the solvent is evaporated in vacuo. The oily residue crystallizes upon trituration with methanol. Recrystallization from methanol affords pure 1-methylsulphinylmethyl-2,4,5-tribromo-imidazole, m.p. 120°–121°.

EXAMPLE F

A solution of 54.7 parts of 1-methylthiomethyl-2,4,5-tribromoimidazole and 80 parts by volume of 30 percent hydrogen peroxide in 150 parts by volume of glacial acetic acid is heated at 70° for 1 hour. The reaction mixture is diluted with water, neutralized with sodium hydroxide, and the product is extracted with chloroform. The chloroform phase is washed with water, dried, and the solvent is evaporated. The oily residue crystallizes upon trituration with methanol. Recrystallization from methanol and benzene affords pure 1-methylsulphonyl-methyl-2,4,5-tribromoimidazole, m.p. 144°–146°. The 2,4,5-trihaloimidazole derivatives of the general formula I listed in the following table are obtained in the manner described in Examples A to F.

TABLE I

| No. | compounds | physical constants [°C] |
|---|---|---|
| 1. | 1-methoxymethyl-2,4,5-tribromo-imidazole | m.p. 92°–94° |
| 2. | 1-ethoxymethyl-2,4,5-tribromo-imidazole | b.p. 120°–121°/0.02 mm Hg |
| 3. | 1-n-propyloxymethyl-2,4,5-tribromo-imidazole | b.p. 114°–116°/0.02 mm Hg |
| 4. | 1-isopropyloxymethyl-2,4,5-tribromo-imidazole | b.p. 109°–110°/0.02 mm Hg |
| 5. | 1-n-butoxymethyl-2,4,5-tribromo-imidazole | $n_D^{23}$ 1.5563 |
| 6. | 1-isobutyloxymethyl-2,4,5-tribromo-imidazole | b.p. 115°–117°/0.03 mm Hg |
| 7. | 1-sec.-butoxymethyl-2,4,5-tribromo-imidazole | b.p. 115°–117°/0.1 mm Hg |
| 8. | 1-n-pentoxymethyl-2,4,5-tribromo-imidazole | $n_D^{23}$ 1.5425 |
| 9. | 1-n-octyloxymethyl-2,4,5-tribromo-imidazole | $n_D^{23}$ 1.5234 |
| 10. | 1-dodecyloxymethyl-2,4,5-tribromo-imidazole | $n_D^{23}$ 1.5025 |
| 11. | 1-allyloxymethyl-2,4,5-tribromo-imidazole | $n_D^{23}$ 1.5834 |
| 12. | 1-crotyloxymethyl-2,4,5-tribromo-imidazole | $n_D^{24}$ 1.5742 |
| 13. | 1-methallyloxymethyl-2,4,5-tribromo-imidazole | b.p. 134°/0.05 mm Hg |
| 14. | 1-n-hexyloxymethyl-2,4,5-tribromo-imidazole | b.p. 128°–130°/0.05 mm Hg |
| 15. | 1-n-hexadecyloxymethyl-2,4,5-tribromo-imidazole | |
| 16. | 1-(2-propinyl)-oxymethyl-2,4,5-tribromo-imidazole | m.p. 71°–73° |
| 17. | 1-(1-methyl-2-propinyl)-oxymethyl-2,4,5-tribromo-imidazole | |
| 18. | 1-(2-chloroethyl)-oxymethyl-2,4,5-tribromo-imidazole | |
| 19. | 1-(2-bromoethyl)-oxymethyl-2,4,5-tribromo-imidazole | |
| 20. | 1-(2,2,2-trichloroethyl)-oxymethyl-2,4,5-tribromo-imidazole | |
| 21. | 1-(2-chloro-2-methylpropyl)-oxy- | | methyl-2,4,5-tribromo-imidazole
22. 1-(2-bromo-2-methylpropyl)-oxymethyl-2,4,5-tribromo-imidazole
23. 1-(2-methyloxyethyl)-oxymethyl-2,4,5-tribromo-imidazole  b.p. 130°–133°/0.001 mm Hg
24. 1-(2-ethyloxyethyl)-oxymethyl-2,4,5-tribromo-imidazole
25. 1-(2-methylthioethyl)-oxymethyl-2,4,5-tribromo-imidazole
26. 1-(2-cyanoethyl)-oxymethyl-2,4,5-tribromo-imidazole
27. 1-methylthiomethyl-2,4,5-tribromo-imidazole  m.p. 97°–98°
28. 1-ethylthiomethyl-2,4,5-tribromo-imidazole  b.p. 139°–142°/0.002 mm Hg
29. 1-n-propylthiomethyl-2,4,5-tribromo-imidazole  b.p. 129°–131°/0.001 mm Hg
30. 1-isopropylthiomethyl-2,4,5-tribromo-imidazole  b.p. 146°–148°/0.02 mm Hg
31. 1-sec.-butylthiomethyl-2,4,5-tribromo-imidazole  b.p. 133°–135°/0.02 mm Hg
32. 1-isobutylthiomethyl-2,4,5-tribromo-imidazole  b.p. 133°–135°/0.01 mm Hg
33. 1-tert.-butylthiomethyl-2,4,5-tribromo-imidazole  m.p. 74°–76°
34. 1-n-pentylthiomethyl-2,4,5-tribromo-imidazole
35. 1-n-octylthiomethyl-2,4,5-tribromo-imidazole
36. 1-n-dodecylthiomethyl-2,4,5-tribromo-imidazole
37. 1-allylthiomethyl-2,4,5-tribromo-imidazole
38. 1-(2-chloroethyl)-thiomethyl-2,4,5-tribromo-imidazole  $n_D^{24}$ 1.6115
39. 1-(2-bromoethyl)-thiomethyl-2,4,5-tribromo-imidazole
40. 1-(2-methyloxyethyl)-thiomethyl-2,4,5-tribromo-imidazole
41. 1-(2-methylthioethyl)-thiomethyl-2,4,5-tribromo-imidazole  m.p. 75°–78°
42. 1-(2-cyanoethyl)-thiomethyl-2,4,5-tribromo-imidazole
43. 1-methylsulphinylmethyl-2,4,5-tribromo-imidazole  m.p. 120°–121°
44. 1-isopropylsulphinylmethyl-2,4,5-tribromo-imidazole  m.p. 107°–109°
45. 1-methylsulphonylmethyl-2,4,5-tribromo-imidazole  m.p. 144°–146°
46. 1-ethylsulphonylmethyl-2,4,5-tribromo-imidazole  m.p. 97°–99°
47. 1-(2-methyloxyethyl)-2,4,5-tribromo-imidazole
48. 1-(2-methylthioethyl)-2,4,5-tribromo-imidazole
49. 1-methyloxymethyl-4,5-dibromo-2-chloro-imidazole  m.p. 80°–81°
50. 1-ethyloxymethyl-4,5-dibromo-2-chloro-imidazole  b.p. 107°–108°/0.005 mm Hg
51. 1-n-propyloxymethyl-4,5-dibromo-2-chloro-imidazole  b.p. 103°–106.5°/0.01 mm Hg
52. 1-methylthiomethyl-4,5-dibromo-2-chloro-imidazole  m.p. 99°–101°
53. 1-ethylthiomethyl-4,5-dibromo-2-chloro-imidazole  b.p. 157°–158°/0.01 mm Hg
54. 1-n-propylthiomethyl-4,5-dibromo-2-chloro-imidazole  $n_D^{20}$ 1.588
55. 1-isopropylthiomethyl-4,5-dibromo-2-chloro-imidazole  b.p. 111°/0.001 mm Hg
56. 1-sec.-butylthiomethyl-4,5-dibromo-2-chloro-imidazole  b.p. 113°/0.001 mm Hg
57. 1-tert.-butylthiomethyl-4,5-dibromo-2-chloro-imidazole  m.p. 63°–65°
58. 1-methyloxymethyl-2,4,5-trichloro-imidazole  b.p. 80°–81°/0.007 mm Hg
59. 1-ethyloxymethyl-2,4,5-trichloro-imidazole  b.p. 81°–83°/0.01 mm Hg
60. 1-n-propyloxymethyl-2,4,5-trichloro-imidazole  b.p. 88°–89°/0.0005 mm Hg
61. 1-isopropyloxymethyl-2,4,5-trichloro-imidazole  b.p. 82°–84°/0.01 mm Hg
62. 1-n-butyloxymethyl-2,4,5-trichloro-imidazole  b.p. 90°–93°/0.0005 mm Hg
63. 1-sec.-butyloxymethyl-2,4,5-trichloro-imidazole  b.p. 81°–83°/0.0005 mm Hg
64. 1-tert.-butyloxymethyl-2,4,5-trichloro-imidazole
65. 1-allyloxymethyl-2,4,5-trichloro-imidazole  b.p. 81°–84°/0.001 mm Hg
66. 1-methylthiomethyl-2,4,5-trichloro-imidazole  m.p. 72°–73°
67. 1-ethylthiomethyl-2,4,5-trichloro-imidazole  b.p. 94°–96°/0.01 mm Hg
68. 1-n-propylthiomethyl-2,4,5-trichloro-imidazole  b.p. 106°–108°/0.01 mm Hg
69. 1-isopropylthiomethyl-2,4,5-trichloro-imidazole  b.p. 127°–128°/0.06 mm Hg
70. 1-n-butylthiomethyl-2,4,5-trichloro-imidazole  b.p. 115°–117°/0.01 mm Hg
71. 1-sec.-butylthiomethyl-2,4,5-trichloro-imidazole  b.p. 106°–108°/0.01 mm Hg
72. 1-tert.-butylthiomethyl-2,4,5-trichloro-imidazole
73. 1-(2-methyloxyethyl)-2,4,5-trichloro-imidazole
74. 1-n-heptyloxymethyl-2,4,5-tribromo-imidazole  bp. 145°–146°/0.001 mm Hg
75. 1-n-octyloxymethyl-2,4,5-tribromo-imidazole  bp. 166°/0.01 mm Hg
76. 1-n-nonyloxymethyl-2,4,5-tribromo-imidazole  bp. 154°–158°/0.01 mm Hg
77. 1-isopropyloxymethyl-4,5-dibromo-2-chloro-imidazole  bp. 96°/0.01 mm Hg
78. 1-n-butyloxymethyl-4,5-dibromo-2-chloro-imidazole  bp. 110°–114°/0.001 mm Hg
79. 1-isobutyloxymethyl-4,5-dibromo-2-chloro-imidazole  bp. 110°–111°/0.005 mm Hg
80. 1-sec.-butyloxymethyl-4,5-dibromo-2-chloro-imidazole  bp. 103°–106°/0.001 mm Hg
81. 1-isobutyloxymethyl-2,4,5-trichloro-imidazole  bp. 90°–93°/0.05 mm Hg
82. 1-crotyloxymethyl-2,4,5-trichloro-imidazole  bp. 90°/0.05 mm Hg
83. 1-methallyloxymethyl-2,4,5-trichloroimidazole  bp. 87°/0.01 mm Hg
84. 1-(2-propinyl-oxymethyl)-2,4,5-trichloro-imidazole  mp. 44°–45°
85. 1-n-pentyloxymethyl-2,4,5-trichloro-imidazole  bp. 96°–99°/0.001 mm Hg
86. 1-(3'-methyl-1'butyl-oxymethyl)-2,4,5-trichloro-imidazole  bp. 100°–102°/0.01 mm Hg
87. 1-(2'-methyl-1'-butyl-oxymethyl)-2,4,5-trichloro-imidazole  bp. 89°–91°/0.01 mm Hg
88. 1-(2'-pentyl-oxymethyl)-2,4,5-trichloro-imidazole  bp. 88°–89°/0.001 mm Hg
89. 1-(3'-pentyl-oxymethyl)-2,4,5-trichloro-imidazole  bp. 81°/0.01 mm Hg
90. 1-(3'-methyl-2'-butyl-oxymethyl)-2,4,5-trichloro-imidazole  bp. 85°–86°/0.05 mm Hg
91. 1-(2',2'-dimethyl-1'-propyl-oxymethyl)-2,4,5-trichloro-imidazole  bp. 72°–74°/0.01 mm Hg
92. 1-hexyloxymethyl-2,4,5-trichloro-imidazole  bp. 112°–113°/0.05 mm Hg
93. 1-n-heptyloxymethyl-2,4,5-trichloro-imidazole  bp. 114°–115°/0.01 mm Hg
94. 1-n-octyloxymethyl-2,4,5-trichloro-imidazole  bp. 144°–145°/0.01 mm Hg
95. 1-n-nonyloxymethyl-2,4,5-trichloro-imidazole  bp. 132°/0.01 mm Hg
96. 1-n-decyloxymethyl-2,4,5-trichloro-imidazole  bp. 143°–146°/0.01 mm Hg
97. 1-n-undecyloxymethyl-2,4,5-trichloro-imidazole  bp. 152°–155°/0.01 mm Hg
98. 1-n-dodecyloxymethyl-2,4,5-trichloro-imidazole  bp. 166°/0.01 mm Hg
99. 1-n-hexadecyloxymethyl-2,4,5-trichloro-imidazole  mp. 33°–34°

The active substances named in the Examples A to F as well as those listed in Table I are used for the preparation of insecticidal and acaricidal compositions according to the invention.

The following examples serve to illustrate the invention and describe the production of forms of application. Where not otherwise expressly stated, parts and percentages are given by weight.

Dust

To produce (a) a 10 percent and (b) a 2 percent dust, the following substances are used:

a. 10 parts of 1-methyloxymethyl-4,5-dibromo-2-chloroimidazole,
5 parts of highly dispersed silicic acid,
85 parts of talcum;

b. 2 parts of 1-ethyloxymethyl-2,4,5-tribromo-imidazole,
1 part of highly dispersed silicic acid,
97 parts of talcum.

The active substances are mixed and milled with the carriers. The dusts obtained are suitable e.g. for combatting cockroaches and ants in houses.

Wettable powder

To produce (a) a 50 percent and (b) a 10 percent wettable powder, the following components are used:

a. 50 parts of 1-methoxymethyl-2,4,5-trichloro-imidazole, 5 parts of naphthalene sulphonic acid/phenol sulphonic acid/formaldehyde condensate,
5 parts of Champagne chalk,
20 parts of kieselguhr,
15 parts of kaolin,
5 parts of oleoyl methyl tauride sodium salt;

b. 10 parts of 1-isopropyloxymethyl-2,4,5-trichloro-imidazole,
3 parts of a mixture of the sodium salts of saturated fatty alcohol sulphates,
5 parts of naphthalene sulphonic acid/formaldehyde condensate,
82 parts of kaolin.

The active substances are intimately mixed with the additives in suitable mixers and milled in corresponding mills and rollers. Wettable powders are obtained which can be diluted with water to any concentration desired. Such suspensions can be used for the protection of stored goods and harvested crops against chewing and sucking insects.

Emulsion concentrate

To produce a 25 percent emulsion concentrate,
25 parts of 1-allyloxymethyl-2,4,5-trichloro-imidazole,
2.5 parts of epichlorhydrin,
5 parts of an emulsifier comprising alkylaryl polyethylene/calcium alkylaryl sulphonate, and
67.5 parts of xylene,
are mixed together. This concentrate can be diluted with water to form emulsions having concentrations suitable for the protection of stored goods. Such emulsions are particularly suitable for combatting ticks on farm and domestic animals.

Wettable powder

The following components are used to produce (a) a 50 percent and (b) a 10 percent wettable powder:

a. 50 parts of 1-ethyl oxy methyl-2,4,5-tribromo-imidazole,
5 parts of the sodium salt of oleoyl methyl taurine,
2.5 parts of disodium salt of dinaphthalene methane disulphonic acid,
25 parts of calcareous earth-clay silicates, and
17.5 parts of kaolin;

b. 10 parts of 1-methylthiomethyl-2,4,5-tribromo-imidazole,
3 parts of a mixture of the sodium salts of saturated fatty alcohol sulphonates (fatty alcohols = $C_8 - C_{18}$),
5 parts of the disodium salt of dinaphthalene methane disulphonic acid, and
82 parts of kaolin.

The amounts of active substance mentioned are intimately mixed with the additives in suitable mixers and milled in corresponding mills and rollers. Wettable powders are obtained which can be diluted with water to form suspensions of any concentration desired. Such suspensions are used chiefly for combatting domestic flies and mosquitoes.

Emulsion concentrate

The following components are mixed together to produce a 25 percent emulsion concentrate:
25 parts of 1-isopropylthiomethyl- 4,5- dibromo-2-chloroimidazole,
10 parts of diacetone alcohol,
2 parts of iso-octyl-phenoxy-polyoxyethylene-ethanol,
3 parts of emulsifier consisting of a mixture of the calcium salt of dodecylbenzene sulphonic acid and nonylphenol polyoxyethylene (e.g. P 140 HFP, Union Chimique Belge S.A., Brussels), and
60 parts of xylene.

These concentrates can be diluted with water to form emulsions of any concentration desired. Such emulsions are used, e.g. to control domestic flies and mosquitoes.

Paste

The following substances are used to produce a 45 percent paste:
45 parts of 1-n-butoxy-methyl-2,4,5-trichloroimidazole,
5 parts of sodium aluminum silicate,
14 parts of cetylpolyglycol ether (condensation product with 8 mols of ethylene oxide),
1 part of oleyl polyglycol ether (condensation product of oleyl alcohol and 5 mols of ethylene oxide),
2 parts of spindle oil,
10 parts of polyethylene glycol ether ("Carbowax"), and
23 parts of water.

The active substance is intimately mixed and milled with the additives in suitable apparatus. A paste is obtained from which, by dilution with water, suspensions of any concentration desired can be produced. Such suspensions are used, in particular, for controlling ticks.

Dust

To produce a 10 percent dust:
10 parts of 1-methylthiomethyl-2,4,5-trichloro-imidazole,
5 parts of highly dispersed silicic acid, and
85 parts of talcum
are intimately mixed. Such a dust can be used, e.g. to control acarinae on vegetables, ornamental plants and shrubs, and berry bushes.

Dust

To produce (a) a 10 percent, (b) a 5 percent and (c) a 2 percent dust, the following substances are used:

a. 10 parts of 1-n-pentyloxymethyl-2,4,5-trichloroimidazole,
5 parts of highly dispersed silicic acid,
85 parts of talcum;

b. 5 parts of 1-n-pentyloxymethyl-2,4,5-trichloroimidazole,
10 parts of highly dispersed silicic acid,
85 parts of kaolin B 24;

c. 2 parts of 1-(2',2'-dimethyl-1'-propyl-oxymethyl)-2,4,5-trichloro-imidazole,
1 part of highly dispersed silicic acid,
97 parts of talcum.

The active ingredients are mixed and ground with the carriers. The resulting dusts are, e.g., suitable for the control of cockroaches and ants in buildings.

Emulsion concentrate

To produce 25 percent emulsion concentrates, e.g., a. 24 parts of 1-n-pentyloxymethyl-2,4,5-trichloroimidazole,
2.5 parts of epichlorohydrin,
5 parts of an emulsifier consisting of alkylaryl polyethylene glycol/calcium alkylaryl sulfonate, and
67.5 parts of xylene;

b. 25 parts of 1-(2',2'-dimethyl-1'-propyl-oxymethyl)-2,4,5-trichloroimidazole,
10 parts of diacetone alcohol,
2 parts of iso-octyl-phenoxy-polyoxyethylene-ethanol,
3 parts of emulsifier consisting of a mixture of calcium dodecylbenzene sulfonate and nonylphenol polyoxyethylene (e.g. P 140 HFP, manufactured by Union Chemique Belge S.A., Brussels), and
60 parts of xylene;

are mixed together. These concentrates can be diluted with water to form emulsions of any concentration desired. Such emulsions are particularly suitable for combatting cockroaches.

Wettable powder

The following components are used to produce (a) a 50 percent and (b) a 10 percent wettable powder:

a. 50 parts of 1-(2',2'-dimethyl-1'-propyl-oxymethyl)-2,4,5-trichloroimidazole,
5 parts of the sodium salt of oleoyl methyl taurine,
2.5 parts of disodium dinaphthalene methane disulfonate,
25 parts of calcareous earth-clay silicates, and
17.5 parts of kaolin;

b. 10 parts of 1-n-pentyloxymethyl-2,4,5-trichloroimidazole,
3 parts of a mixture of the sodium salts of saturated fatty alcohol sulfonates (fatty alcohols = $C_8-C_{18}$),
5 parts of disodium dinaphthalene methane disulfonate, and
82 parts of kaolin.

The amounts of active substance mentioned are intimately mixed with the additives in suitable mixers and ground in appropriate mills and rollers. Wettable powders are obtained which can be diluted with water to form suspensions of any concentration desired. Such suspensions are used for combatting cockroaches.

Paste

The following substances are used to produce a 45 percent paste:

45 parts of 1-(2'-methyl-1'-butyloxymethyl)-2,4,5-trichloroimidazole,
5 parts of sodium aluminum silicate,
14 parts of cetylpolyglycol ether (condensation product of saturated $C_8$–$C_{18}$ fatty alcohols with 8 mols of ethylene oxide),
1 part of oleyl polyglycol ether (condensation product of oleyl alcohol and 5 mols of ethylene oxide),
2 parts of spindle oil,
10 parts of polyethylene glycol ether ("Carbowax"), and
23 parts of water.

The active substance is intimately mixed and ground with the additives in suitable apparatus. A paste is obtained from which, by dilution with water, suspensions of any concentration desired can be produced, which can be used for controlling cockroaches.

Insecticidal contact test a. The amount of 10 mg of the active substance to be tested dissolved in acetone is put into a Petri dish and, after evaporation of the solvent, 20 polyvalent resistent domestic flies or 20 mosquitoes respectively, are placed into the dish. The time elapsing until all insects are in dorsal position is determined.

| No. | compounds | time elapsed until 100% in dorsal position | |
|---|---|---|---|
| | | domestic flies | mosquitoes (Aedes aeg.) |
| 1. | 1-methyloxymethyl-4,5-dibromo-2-chloro-imidazole | 20' | 7' |
| 2. | 1-methyloxymethyl-2,4,5-trichloro-imidazole | 4' | 3' |
| 3. | 1-ethyloxymethyl-2,4,5-tribromo-imidazole | 17' | 10' |
| 4. | 1-ethyloxymethyl-4,5-dibromo-2-chloro-imidazole | 12' | 9' |
| 5. | 1-ethyloxymethyl-2,4,5-trichloro-imidazole | 8' | 8' |
| 6. | 1-n-propyloxymethyl-2,4,5-trichloro-imidazole | 10' | 3' |
| 7. | 1-isopropyloxymethyl-2,4,5-trichloro-imidazole | 4' | 3' |
| 8. | 1-sec.-butyloxymethyl-2,4,5-trichloro-imidazole | 10' | 4' |
| 9. | 1-allyloxymethyl-2,4,5-trichloro-imidazole | 5' | 5' |
| 10. | 1-methyl-2,4,5-tribromoimidazole (known compound) | 28' | 36' |
| 11. | 1-isopropylthiomethyl-4,5-dibromo-2-chloro-imidazole | 60' | 120' | b. To determine the insecticidal effect, 20 mg of 1 percent dust are evenly distributed in Petri dishes. Then cockroaches (*Phyllodromia germanica* and *Periplaneta americana*) are placed in the treated dishes and kept under normal conditions at 22°–24° C.

In the following table, the time is given which elapsed until the animals were in dorsal position.

TABLE II

| Active Ingredient (No. Table I) | Time in minutes until 100% of the animals in dorsal position |
|---|---|
| 85 | 2 |
| 86 | 37 |
| 88 | 37 |
| 87 | 27 |
| 90 | 50 |
| 91 | 26 |
| 89 | 32 |

Acaricidal Test

In order to determine the acaricidal properties of compositions according to the invention, engorged females of a diazinone-resistant strain of *Bophilus microplus* were immersed for 3 minutes in a bath containing per liter
1 g of 1-(n-butyloxymethyl)-2,4,5-trichloroimidazole, and
9 g of an emulsifying mixture consisting of
60 percent of methylcellosolve,
33 percent of petroleum fraction boiling between 185° and 215° C, and
7 percent of an emulsifier consisting of nonylphenyl-decaethyleneglycol ether, and calcium decylphenylsulfonate in a weight ratio of about 2:1,
the balance of the bath liquor consisting of water.

The animals, of which five were used per test, were then placed in a wire cage to dry and then transferred each to a glass tube closed with a cotton stopper, the air in which was held at 80 percent humidity and a temperature of 27°. After 5, 10 and 15 days oviposition was checked; no eggs had been laid.

The same test was repeated with 1-allyloxymethyl-2,4,5-trichloro-imidazole and the same satisfactory result, namely no oviposition after 15 days, was observed.

The term "lower" used in connection with "alkoxy" or "alkylthio" means that such group contains at most four, and preferably not more than three carbon atoms.

We claim:

1. An insecticidal and acaricidal composition which comprises an insecticidally and acaricidally effective amount of a compound of the formula $$\text{R-O-A-} \underset{\underset{\text{Hal}}{|}}{N} \overset{\overset{\text{Hal}}{|}}{\underset{N}{\diagup\diagdown}} \text{Hal}$$

wherein
R represents alkyl of from one to 16 carbon atoms, alkyl of from two to five carbon atoms substituted by a member selected from the group consisting of halogen, lower alkoxy, lower alkylthio and cyano, alkenyl of from two to four carbon atoms, or alkynyl of from three to five carbon atoms,
A represents alkylene of at most two carbon atoms, and
Hal represents chlorine or bromine,
and a carrier which is compatable therewith.

2. The composition of claim 1 for controlling insects which comprises an insecticidally effective amount of a compound of Formula I wherein R is alkyl with five carbon atoms, A is methylene and Hal is chlorine.

3. The composition of claim 1, wherein said compound is 1-methyloxymethyl-2,4,5-trichloro-imidazole.

4. The composition of claim 1, wherein said compound is 1-ethyloxymethyl-2,4,5-trichloro-imidazole.

5. The composition of claim 1, wherein said compound is 1-isopropyloxymethyl-2,4,5-trichloro-imidazole.

6. The composition of claim 1, wherein said compound is 1-allyloxymethyl-2,4,5-trichloro-imidazole.

7. The composition of claim 1, wherein said compound is 1-isopropylthiomethyl-4,5-dibromo-2-chloro-imidazole.

8. The composition of claim 2 wherein said compound is 1-n-pentyloxymethyl-2,4,5-trichloroimidazole.

9. The composition of claim 2, wherein said compound is 1-(2',2'-dimethyl-1'-propyl-oxymethyl)-2,4,5-trichloro-imidazole.

10. The method of controlling insects and acarinae which comprises applying to said insects and acarinae an insecticidally and acaricidally effective amount of the compound defined in claim 1.

11. The method of controlling cockroaches which comprises applying thereto an insecticidally effective amount of the compound as defined in claim 2.

12. The method of claim 11, wherein said compound is 1-n-pentyloxymethyl-2,4,5 trichloroimidazole.

13. The method of claim 11, wherein said compound is 1-(2',2'-dimethyl-1'-propyl-oxymethyl)-2,4,5 trichloroimidazole.

* * * * *